US 12,166,417 B2

(12) United States Patent
Jiang et al.

(10) Patent No.: US 12,166,417 B2
(45) Date of Patent: Dec. 10, 2024

(54) NONLINEAR CURRENT MIRROR FOR FAST TRANSIENT AND LOW POWER REGULATOR

(71) Applicant: QUALCOMM Incorporated, San Diego, CA (US)

(72) Inventors: Jize Jiang, Singapore (SG); Hua Guan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/554,991

(22) Filed: Dec. 17, 2021

(65) Prior Publication Data

US 2023/0198394 A1   Jun. 22, 2023

(51) Int. Cl.
| | | |
|---|---|---|
| *G05F 1/573* | (2006.01) | |
| *G05F 1/445* | (2006.01) | |
| *G05F 1/575* | (2006.01) | |
| *H02M 3/158* | (2006.01) | |

(52) U.S. Cl.
CPC ............ *H02M 3/158* (2013.01); *G05F 1/445* (2013.01); *G05F 1/573* (2013.01); *G05F 1/575* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | | | |
|---|---|---|---|---|---|
| 4,706,036 | A | * | 11/1987 | Rebeschini | ......... H03F 3/45179 330/253 |
| 5,124,632 | A | * | 6/1992 | Greaves | ..................... G05F 3/24 392/407 |
| 5,677,558 | A | * | 10/1997 | McGlinchey | ....... H01L 27/0623 257/373 |
| 5,818,295 | A | * | 10/1998 | Chimura | ............. H03F 3/45183 330/253 |

(Continued)

OTHER PUBLICATIONS

Shi, C., et al., "A Highly Integrated Power Management IC for Advanced Mobile Applications", IEEE Journal of Solid-State Circuits, vol. 42, No. 8, Aug. 2007, pp. 1723-1731.

(Continued)

*Primary Examiner* — Thienvu V Tran
*Assistant Examiner* — Nusrat Quddus
(74) *Attorney, Agent, or Firm* — Patterson+ Sheridan, L.L.P.

(57) ABSTRACT

A power supply circuit and techniques for voltage regulation are described. Certain aspects provide a method of supplying power by a power supply circuit. The method generally includes: generating an output voltage based on a voltage at a Vin node via a first transistor having a gate coupled to a gate of a second transistor, wherein a source of the second transistor is coupled to the Vin node and wherein a drain of the second transistor is coupled a drain of a third transistor; and sourcing a current to the third transistor, wherein during a light load condition of the power supply circuit, the current varies based on the voltage at a Vout node of the power supply circuit, and during a heavy load condition of the power supply circuit, the current is limited based on a current threshold.

13 Claims, 5 Drawing Sheets

(56) References Cited

U.S. PATENT DOCUMENTS

| | | | | |
|---|---|---|---|---|
| 6,538,511 B2* | 3/2003 | Tesch | H03F 1/086 | 330/261 |
| 7,215,103 B1* | 5/2007 | Wong | G05F 1/573 | 323/279 |
| 7,710,090 B1* | 5/2010 | Kimura | G05F 1/5735 | 323/276 |
| 7,843,180 B1* | 11/2010 | Cilingiroglu | G05F 1/575 | 323/273 |
| 8,760,133 B2* | 6/2014 | Hasegawa | G05F 1/575 | 323/280 |
| 8,866,457 B2* | 10/2014 | Endo | G05F 1/575 | 323/280 |
| 10,345,838 B1* | 7/2019 | Karadi | G05F 1/575 | |
| 11,599,132 B2* | 3/2023 | Wu | G05F 1/571 | |
| 2003/0147193 A1* | 8/2003 | Hamon | G05F 1/573 | 323/280 |
| 2007/0026815 A1* | 2/2007 | Kappes | H03F 1/523 | 455/73 |
| 2008/0265863 A1* | 10/2008 | Sugai | G05F 3/24 | 323/351 |
| 2010/0320974 A1* | 12/2010 | Manlove | H02M 3/157 | 323/222 |
| 2011/0241641 A1* | 10/2011 | Chen | H02M 3/1588 | 323/284 |
| 2012/0262137 A1* | 10/2012 | Arigliano | G05F 1/573 | 323/277 |
| 2012/0262138 A1* | 10/2012 | Srinivasan | G05F 1/575 | 323/279 |
| 2013/0257400 A1* | 10/2013 | Zhang | H02M 3/156 | 323/271 |
| 2013/0320942 A1* | 12/2013 | Vemula | G05F 1/573 | 323/265 |
| 2015/0061772 A1 | 3/2015 | Bhattad | | |
| 2015/0194887 A1* | 7/2015 | Nascimento | H03K 19/0013 | 327/309 |
| 2015/0212529 A1* | 7/2015 | Cherewka | H02H 9/008 | 323/303 |
| 2015/0346750 A1* | 12/2015 | Bhattad | G05F 1/575 | 323/280 |
| 2016/0134135 A1* | 5/2016 | Liu | H02J 7/007182 | 320/107 |
| 2017/0060157 A1* | 3/2017 | Jefremow | H02M 3/155 | |
| 2018/0011506 A1* | 1/2018 | Zeng | G05F 1/575 | |
| 2019/0386481 A1* | 12/2019 | Cho | G01R 19/16571 | |
| 2020/0081467 A1 | 3/2020 | Hu et al. | | |
| 2021/0018944 A1 | 1/2021 | Matyscak | | |
| 2021/0026383 A1* | 1/2021 | Sivaraj | G05F 3/205 | |
| 2021/0080986 A1* | 3/2021 | Shreepathi Bhat | G05F 1/569 | |
| 2021/0089068 A1* | 3/2021 | Manohar | G05F 1/59 | |
| 2023/0009164 A1* | 1/2023 | Georgievski | G05F 1/573 | |

OTHER PUBLICATIONS

International Search Report and Written Opinion—PCT/US2022/081169—ISA/EPO—Apr. 26, 2023.

* cited by examiner

NONLINEAR CURRENT MIRROR FOR FAST TRANSIENT AND LOW POWER REGULATOR

TECHNICAL FIELD

Certain aspects of the present disclosure generally relate to electronic circuits and, more particularly, to a power supply circuit and techniques for voltage regulation.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, or a buck-boost converter.

Power management integrated circuits (power management ICs or PMICs) are used for managing the power requirement of a host system and may include and/or control one or more voltage regulators (e.g., boost converters). A PMIC may be used in battery-operated devices, such as mobile phones, tablets, laptops, wearables, etc., to control the flow and direction of electrical power in the devices. The PMIC may perform a variety of functions for the device such as DC-to-DC conversion, voltage regulation, battery charging, power-source selection, voltage scaling, power sequencing, etc. For example, a PMIC may feature an LDO regulator for voltage regulation.

SUMMARY

Certain aspects of the present disclosure relate to a power supply circuit. The power supply circuit may include: a first transistor having a source coupled to an input voltage (Vin) node and a drain coupled to an output voltage (Vout) node; a second transistor having a source coupled to the Vin node; a current limiter circuit; a third transistor having a source coupled to the current limiter circuit; and a fourth transistor having a source coupled to a reference potential node, wherein a drain of the second transistor and a drain of the fourth transistor are coupled to a source of the fourth transistor, and wherein a gate of the second transistor is coupled a gate of first transistor and a gate of the third transistor.

Certain aspects of the present disclosure relate to a wireless device including the power supply circuit described herein.

Certain aspects of the present disclosure relate to an integrated circuit (IC) including the power supply circuit (or at least a portion of the power supply circuit) described herein.

Certain aspects of the present disclosure relate to a method of supplying power by a power supply circuit. The method generally includes: generating an output voltage based on a voltage at a Vin node via a first transistor having a gate coupled to a gate of a second transistor, wherein a source of the second transistor is coupled to the Vin node and wherein a drain of the second transistor is coupled a drain of a third transistor; and sourcing a current to the third transistor, wherein during a light load condition of the power supply circuit, the current varies based on the voltage at the Vin node, and during a heavy load condition of the power supply circuit, the current is limited based on a current threshold.

Certain aspects of the present disclosure relate to an apparatus for supplying power. The apparatus generally includes: a first transistor having a source coupled to a Vin node and a drain coupled to a Vout node; a second transistor having a source coupled to the Vin node; a third transistor having a source coupled to a reference potential node, wherein a drain of the second transistor is coupled to a drain of the third transistor, and wherein a gate of the second transistor is coupled to a gate of first transistor; and means for sourcing a current to the third transistor, wherein during a light load condition of the apparatus, the current is varies based on a voltage at the Vout node, and during a heavy load condition of the apparatus, the current is limited based on a current threshold.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Low power and fast transient operation are two important performance metrics for a low-dropout (LDO) regulator in various applications, such as Fifth Generation (5G) and Internet of Things (IoT) devices. However, it is challenging to achieve both low power operation and fast transient operation simultaneously. The root cause is that at light load conditions, an LDO regulator often suffers from stability issues. To ensure light-load stability, some LDO regulators are designed with low bandwidth that leads to a poor transient response, or the quiescent current associated with the LDO regulator is increased, which results in higher power consumption.

In view of these factors, certain aspects of the present disclosure provide a low-power LDO regulator implementation to address the light-load stability issues without sacrificing transient performance and power consumption. For example, a nonlinear current mirror may be used to drive the LDO power field-effect transistor (FET). During light load conditions, the current mirror has a large mirror ratio that pushes the power FET gate pole to a high frequency. This allows the LDO to be stable with wide bandwidth. In other words, the LDO is stable during light load conditions, and its transient response is fast. During heavy load conditions, the current mirror provides a constant current, increasing LDO power efficiency.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Device

Figure 1:
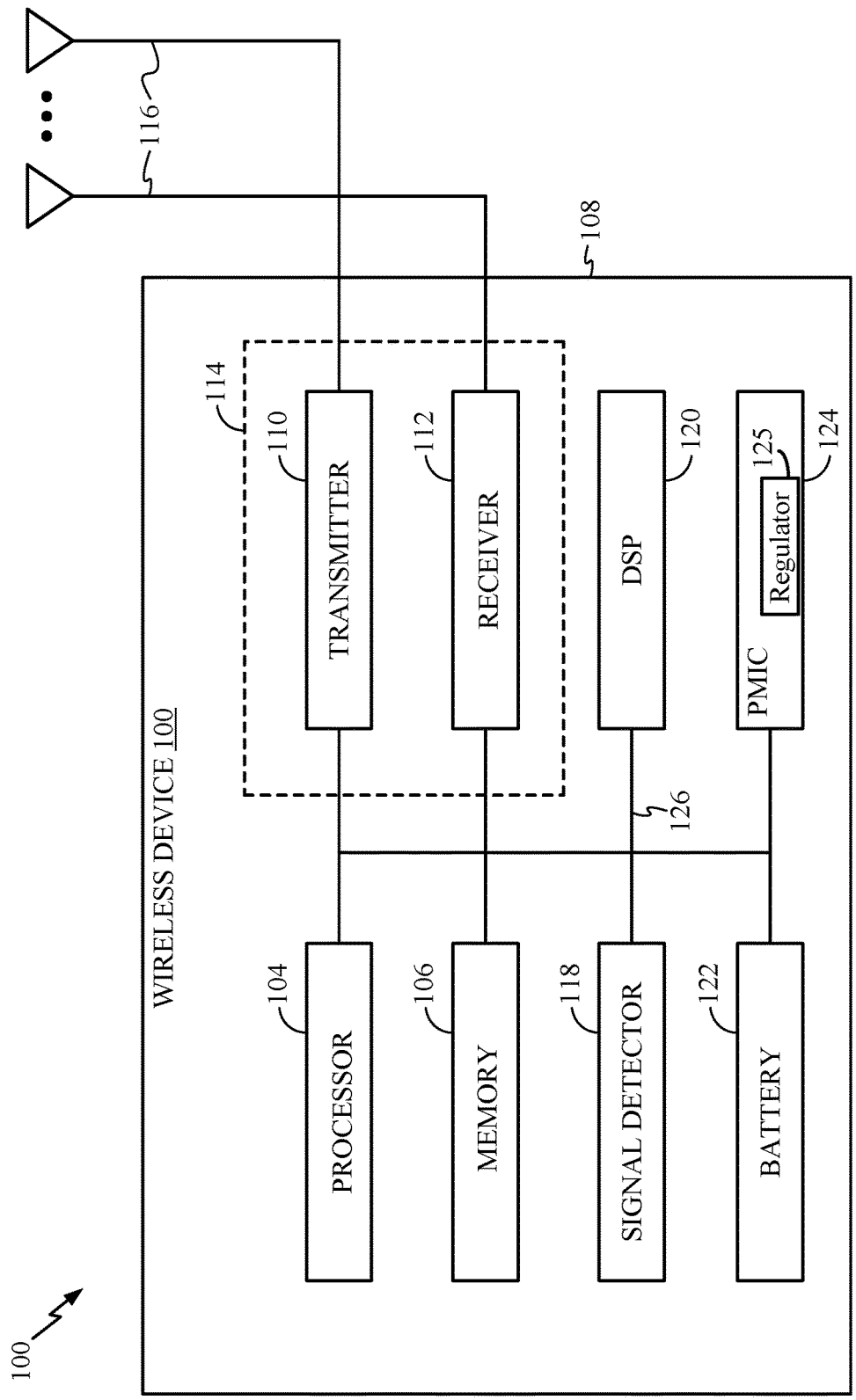
FIG. 1 is a block diagram of an example device including a voltage regulator, according to certain aspects of the present disclosure.

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 which controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, voltage regulation (e.g., with regulator 125) battery charging, power-source selection, voltage scaling, power sequencing, etc. In certain aspects, the regulator 125 may be a low-dropout (LDO) regulator implemented using a nonlinear current mirror.

The various components of the device 100 may be coupled together by a bus system 126, which may include a power bus, a control signal bus, and a status signal bus in addition to a data bus.

Example Voltage Regulation System

Low quiescent current ($I_Q$) is an important LDO performance metric for battery-operated devices as low $I_Q$ allows for extending battery life. Certain aspects are directed to techniques for maintaining low $I_Q$ while also maintaining a fast transient response of the LDO regulator. Light-load stability is often the bottleneck for low $I_Q$ LDO design due to the power gate pole as described with respect to FIGS. 2 and 3. Solving the light-load stability issue has traditionally come with the penalty of reduced loop bandwidth (e.g., due to a large output capacitor being used) and poor transient performance, while also increasing $I_Q$. Certain aspects provide an LDO implementation that provides light-load stability with little to no transient or power penalty to provide a low $I_Q$ LDO.

Figure 2:
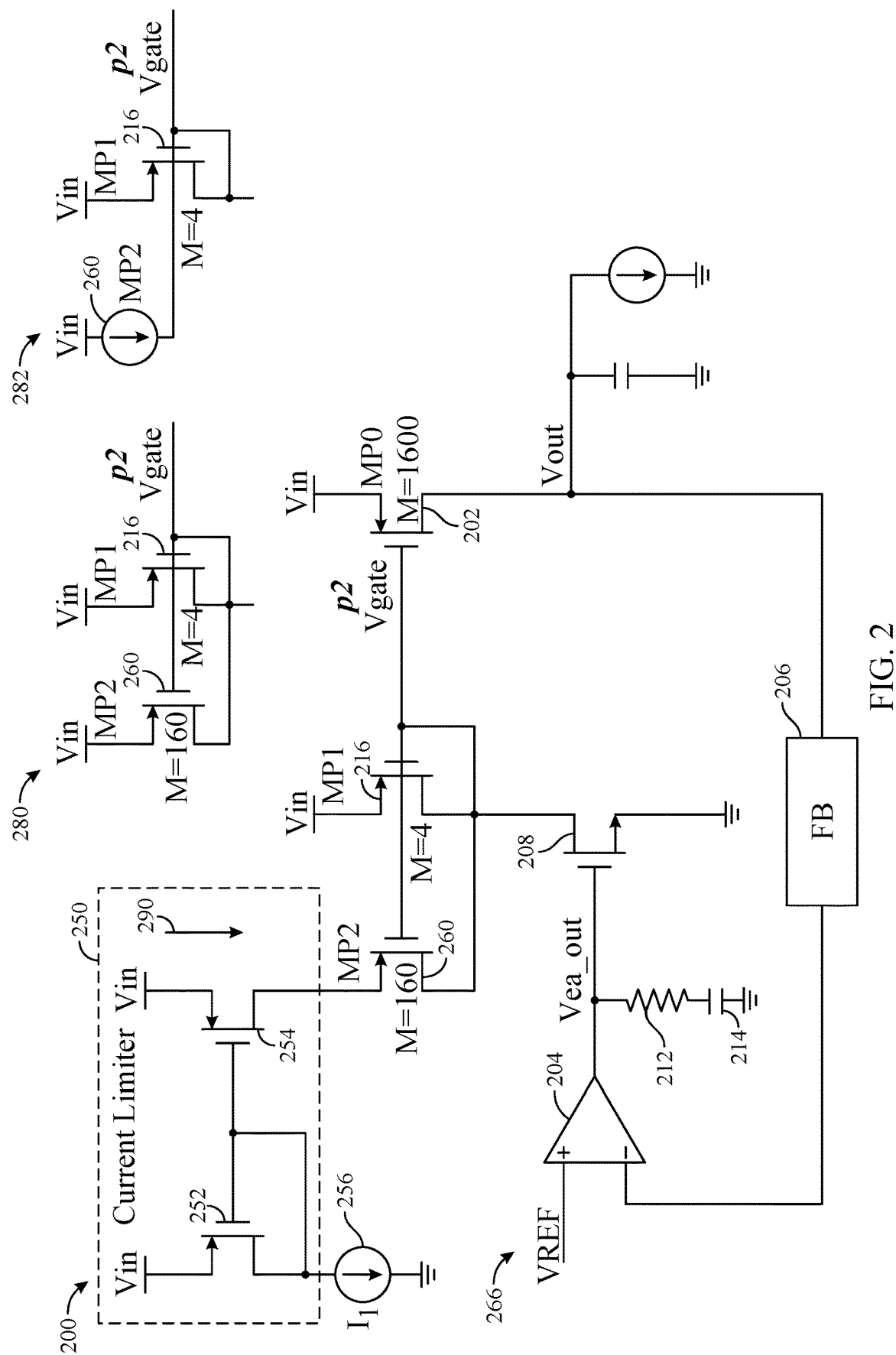
FIG. 2 illustrates a low-dropout (LDO) regulator, in accordance with certain aspects of the present disclosure.

FIG. 2 illustrates an LDO regulator 200, in accordance with certain aspects of the present disclosure. As shown, the LDO regulator 200 includes a transistor 202 (e.g., a power field-effect transistor (FET), which may be a p-type transistor), having a source coupled to an input voltage (Vin) node, as shown. A drain of transistor 202 is coupled to an output voltage (Vout) node. The Vout node may also be coupled to a control circuit 266. For example, a feedback path may be coupled between the Vout node and a negative input of an amplifier 204 (e.g., error amplifier) of the control circuit 266. As shown, the feedback path may include feedback circuitry 206 (e.g., a voltage divider). The positive input of the amplifier 204 may receive a reference voltage VREF, which is compared to Vout (or a processed version thereof) by amplifier 204, to control transistor 208 by generating an error amplifier output voltage (Vea_out). Transistor 208 may be implemented as an n-type transistor. As shown, a series resistor-capacitor (RC) circuit including a resistive element 212 and a capacitive element 214 is coupled in shunt to the output of the amplifier 204.

As shown, a source of transistor 208 is coupled to a reference potential node (e.g., electrical ground node), and a drain of transistor 208 is coupled to a drain and a gate of transistor 216 and to a gate of transistor 202. The transistors 202, 216 form a current mirror with a specific current mirror ratio characterized by the ratio of the sizes of transistors 202, 216. For example, the ratio of sizes of transistors 216, 202 may be 4 to 1600, as shown.

Figure 3:
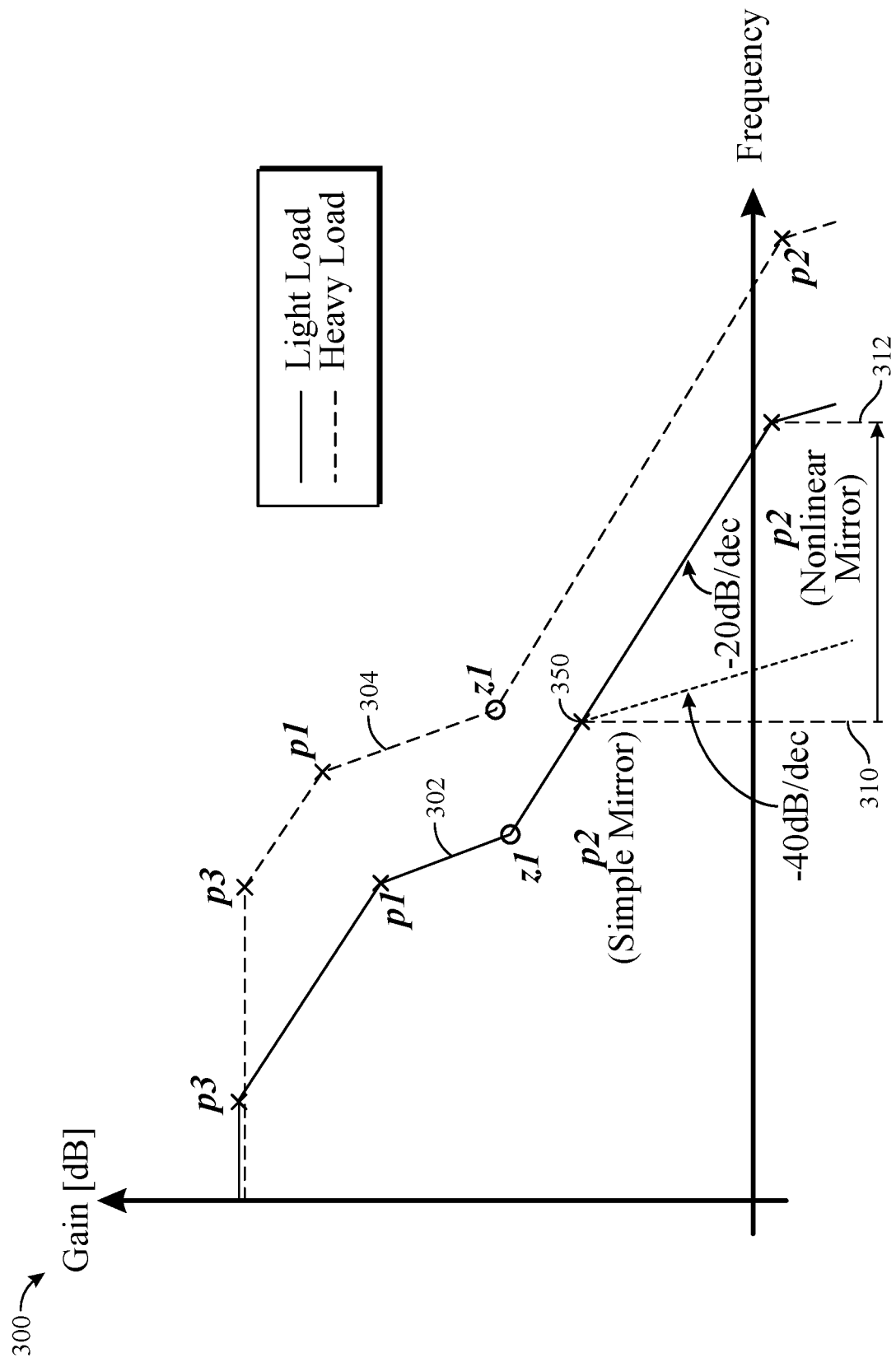
FIG. 3 is a graph showing the gain of an LDO regulator as a function of frequency, in accordance with certain aspects of the present disclosure.

FIG. 3 is a graph 300 showing the gain of the LDO regulator 200 as a function of frequency (e.g., the frequency response), in accordance with certain aspects of the present disclosure. As shown, the response of the LDO regulator 200 includes three poles (p1, p2, p3) and one zero (z1). Moreover, curve 302 shows the response of the LDO regulator 200 under light load conditions, and curve 304 shows the response of the LDO regulator 200 under heavy load conditions. The pole p1 and zero z1 are associated with the output of the amplifier 204 (e.g., due to the shunt RC circuit coupled to the output of the amplifier 204). The pole p2 is associated with the gate of transistor 202, and the pole p3 is associated with the output of the LDO (Vout). During heavy load conditions, the transconductance of the current mirror buffer stage of the LDO regulator 200 is large, and as a result, the pole p2 is greater than the unity gain bandwidth (UGB) of the LDO regulator, such that the LDO regulator is stable. When using a traditional current mirror, the pole p2 (e.g., pole 350) occurs at a relatively low frequency during light load conditions as compared to heavy load conditions, causing stability issues during light load conditions. In other words, during light load conditions, the transconductance of the current mirror buffer stage is small, and the pole p2 is less than UGB, causing stability issues. Certain aspects implement a nonlinear current mirror to transition the pole p2 to a higher frequency (e.g. from frequency 310 to frequency 312) during light load conditions, as shown.

Referring back to FIG. 2, a current limiter circuit 250 (e.g., implemented using a nonlinear current mirror) may be coupled to the gate of transistor 202. For example, the current limiter circuit 250 includes a transistor 252 and a transistor 254, where a gate of transistor 254 is coupled to a drain and a gate of transistor 252, as shown. Sources of transistors 252, 254 are coupled to the Vin node. The drain of transistor 252 is coupled to a current source 256 sinking a current $I_1$, and a drain of transistor 254 is coupled to a source of transistor 260. At light load conditions, transistors 260, 202 form a current mirror having a relatively large current mirror ratio (e.g., 160 to 1600, or 1 to 10). The transistor 260 acts as a diode providing a low impedance path between the Vin node and the drain of transistor 208 (e.g., gate of transistor 202), effectively shifting the pole p2 to a higher frequency at light load conditions. However, at heavy load conditions, the transistors 216, 202 form a current mirror having a relatively small current mirror ratio (e.g., 1 to 400).

The current limiter circuit 250 serves to limit the current supplied through transistor 260 to the drain of transistor 208 during heavy load conditions. For example, the current 290 may be limited to $I_1$ that is sunk by current source 256. Thus, during heavy load conditions, the source-to-drain current of transistor 260 is limited to $I_1$, reducing the power consumption of the LDO regulator 200. In other words, without the current limiter circuit 250, the source-to-drain current of transistor 260 may be greater than $I_1$ (e.g., depending on the drain-to-source current of transistor 202 and the 1 to 10 current mirror ratio), increasing power consumption.

At light load conditions, the current limiter circuit 250 no longer mirrors the current $I_1$, as transistor 254 is operated in the triode region. Thus, as shown by equivalent circuit 280, the transistor 260 acts as a diode (e.g. a diode-connected transistor) during light load conditions, sourcing a current from Vin to the drain of transistor 208. Thus, at light load conditions, the transistor 260 provides a low impedance node, transitioning pole p2 to a higher frequency and providing light-load stability, as described. However, at heavy load conditions, the current limiter circuit 250 mirrors the current $I_1$ and supplies a maximum current of $I_1$ (e.g., a constant current) to the source of 260. Thus, at heavy load conditions, the transistor 260 acts as a current source, as shown by the equivalent circuit 282, improving heavy load power efficiency.

Figure 4:
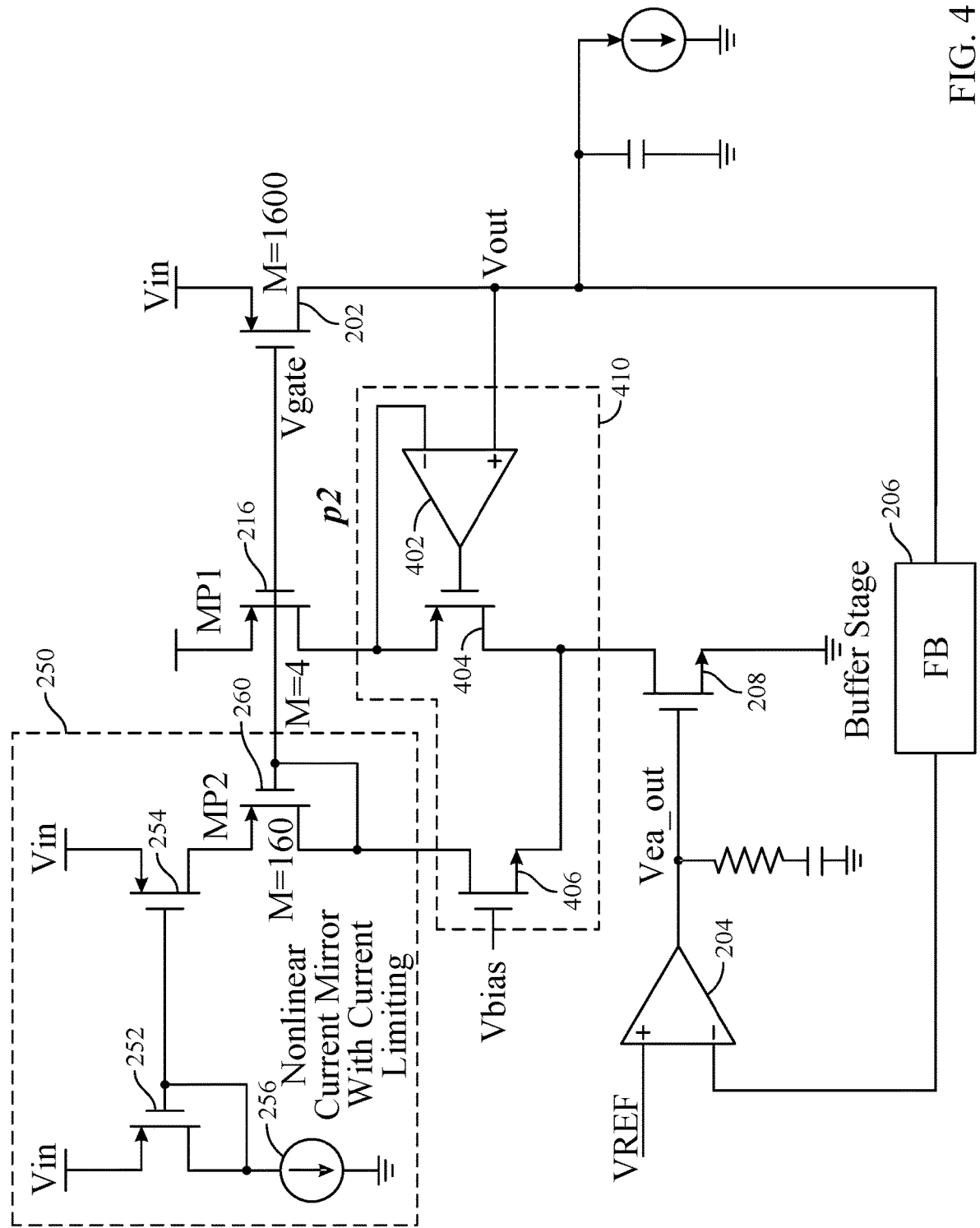
FIG. 4 illustrates an LDO regulator implemented using a drain-to-source voltage (Vds) clamp circuit, in accordance with certain aspects of the present disclosure.

FIG. 4 illustrates an LDO regulator 400 implemented using a drain-to-source voltage (Vds) clamp circuit 410, in accordance with certain aspects of the present disclosure. The Vds clamp circuit 410 sets the Vds of transistor 216 to be about equal to the Vds of transistor 202, increasing the accuracy of the LDO regulator 200 (e.g., accuracy of setting Vout based on VREF). In other words, without the Vds clamp circuit 410, the Vds of transistor 202 may be different than the Vds of transistor 216, and as a result, the Vds to source-to-drain current (Ids) ratio associated with transistor 202 may be different than the Vds to Ids ratio associated with transistor 216, causing inaccuracies associated with the voltage regulation of the LDO regulator 200. By setting the Vds of transistor 202 and Vds of transistor 216 to be about the same using the Vds clamp circuit 410, the accuracy of the LDO regulator 200 may be increased.

As shown, the Vds clamp circuit 410 includes an amplifier 402 having a positive input coupled to the Vout node, and a negative input coupled to the drain of transistor 216 and a source of transistor 404. The output of amplifier 402 is coupled to the gate of transistor 404. Thus, amplifier 402 controls the transistor 404 to set the drain of transistor 216 to be equal to Vout, in effect setting the Vds of transistor 216 to be equal to the Vds of transistor 202. As shown, the drain of transistor 404 is coupled to the drain of transistor 208.

As a result of implementing the amplifier 402 and transistor 404 of the Vds clamp, another transistor 406 is coupled between the drain of transistor 260 and the drain of transistor 208 as a means of electrically decoupling the drain of transistor 260 from the drain of transistor 208. As shown, the gate of transistor 406 may be biased using a biasing voltage (Vbias). A source of transistor 406 is coupled to the drain of transistor 404 and to the drain of transistor 208, and a drain of transistor 406 is coupled to the gate and drain of transistor 260.

Example Power Supply Circuit

Certain aspects of the present disclosure provide a power supply circuit. The power supply circuit may include a first transistor (e.g., transistor 202) having a source coupled to an input voltage (Vin) node and a drain coupled to an output voltage (Vout) node; a second transistor (e.g., transistor 216) having a source coupled to the Vin node; a current limiter circuit (e.g., current limiter circuit 250); a third transistor (e.g., transistor 260) having a source coupled to the current limiter circuit; and a fourth transistor (e.g., transistor 208) having a source coupled to a reference potential node. In some aspects, a drain of the second transistor and a drain of the third transistor are coupled to a drain of the fourth transistor. Moreover, a gate of the second transistor may be coupled to a gate of the first transistor and a gate of the third transistor.

In some aspects, during a light load condition of the power supply circuit, the current limiter circuit and the third transistor are configured to provide a current that varies based on a voltage at the Vout node. During a heavy load condition of the power supply circuit, the current limiter circuit and the third transistor are configured to provide a current that is limited based on a current threshold. For example, the power supply circuit may also include a current source (e.g., current source 256) configured to set the current threshold.

In some aspects, the first transistor and the second transistor form a first current mirror, and the first transistor and the third transistor form a second current mirror. In some aspects, a size of the first transistor and a size of the second transistor has a first ratio (e.g., 1600:4), and a size of the first transistor and a size of the third transistor has a second ratio (e.g., 1600:16), the second ratio being less than the first ratio.

In some aspects, the power supply circuit also includes a current source (e.g., current source 256). The current limiter circuit may include a fifth transistor (e.g., transistor 252) having a source coupled to the Vin node and a drain coupled to the current source, and a sixth transistor (e.g., transistor 254) having a source coupled to the Vin node and a drain coupled to the source of the third transistor. A gate of the sixth transistor may be coupled to the drain and a gate of the fifth transistor (e.g., forming a current mirror).

In some aspects, the power supply circuit also includes a control circuit. The control circuit may include an amplifier (e.g., amplifier 204) having an output coupled to a gate of the fourth transistor, and a feedback path coupled between the Vout node and an input of the amplifier. Another input of the amplifier may be coupled to a reference voltage (VREF) node. The power supply circuit may also include a resistor-capacitor (RC) circuit coupled between an output of the amplifier and a reference potential node (e.g., electrical ground).

In some aspects, the third transistor and the current limiter circuit are configured to source a constant current (e.g., $I_1$) during heavy load conditions of the power supply circuit. During light load conditions, the third transistor and the current limiter circuit are configured to operate as a diode coupled between the Vin node and the fourth transistor.

In some aspects, the power supply circuit may include a drain-to-source voltage (Vds) clamp circuit (e.g., Vds clamp circuit 410) coupled to the drain of the second transistor. The Vds clamp circuit may include a fifth transistor (e.g., transistor 404) having a source coupled to the drain of the second transistor, and an amplifier (e.g., amplifier 402) having a positive input coupled to the Vout node, a negative input coupled to the drain of the second transistor and the source of the fifth transistor, and an output coupled to a gate of the fifth transistor. A sixth transistor (e.g., transistor 406) may be coupled between the drain of the third transistor and the drain of the fourth transistor.

Example Techniques for Supplying Power

Figure 5:
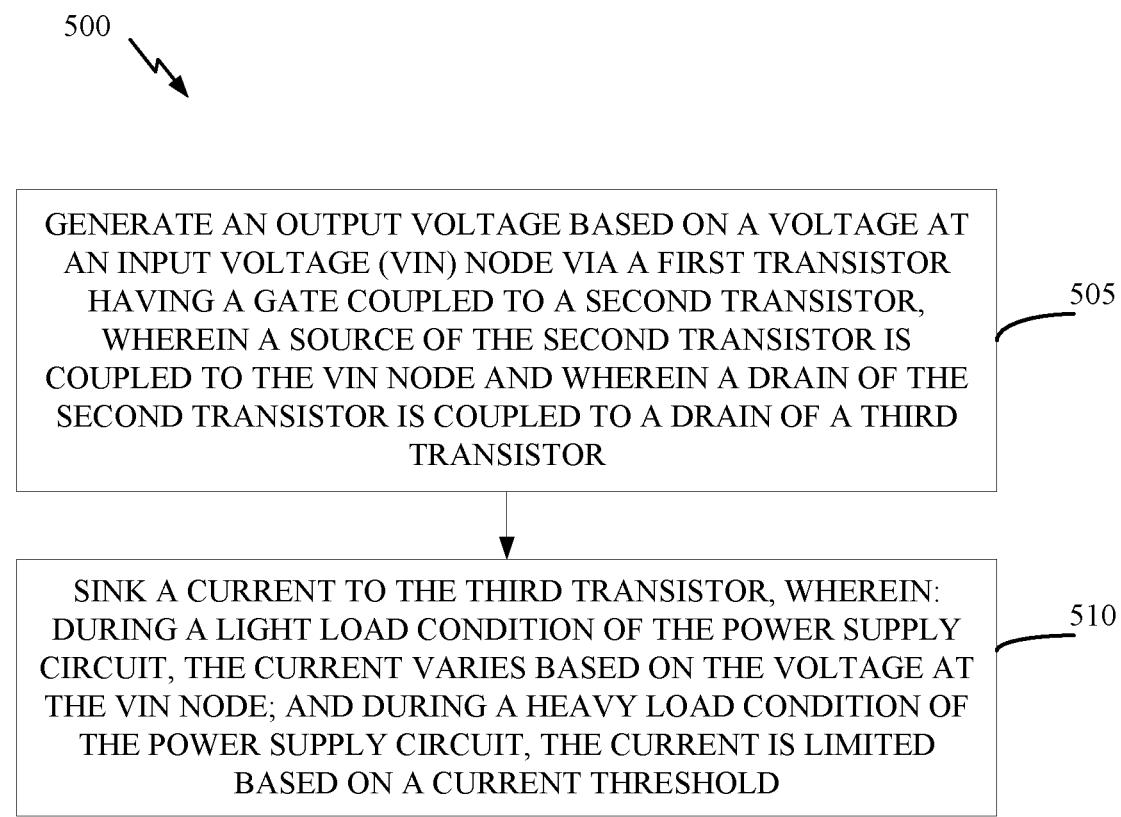
FIG. 5 is a flow diagram illustrating example operations for supplying power, in accordance with certain aspects of the present disclosure.

FIG. 5 is a flow diagram illustrating example operations 500 for supplying power, in accordance with certain aspects of the present disclosure. The operations 500 may be performed, for example, by a power supply circuit, such as the LDO regulator 200.

The operations 500 begin, at block 505, with the power supply circuit generating an output voltage based on a voltage at an input voltage (Vin) node via a first transistor (e.g., transistor 202) having a gate coupled to a second transistor (e.g., transistor 216). A source of the second transistor may be coupled to the Vin node and a drain of the second transistor may be coupled a drain of a third transistor (e.g., transistor 208). At block 510, the power supply circuit may source a current to the third transistor. In some aspects, during a light load condition of the power supply circuit, the current varies based on the voltage at a Vout node of the power supply circuit, and during a heavy load condition of the power supply circuit, the current is limited based on a current threshold. For example, the current may be limited based on the current threshold via a current limiter circuit (e.g., current limiter circuit 250). The power supply circuit may set the current threshold via a current source (e.g., current source 256) coupled to the current limiter circuit.

In some aspects, the power supply circuit further sets (e.g., via Vds clamp circuit 410) a drain-to-source voltage (Vds) of the second transistor based on a Vds of the first transistor. In some aspects, the power supply circuit mirrors a current sunk by a current source (e.g., current source 256). The current sunk to the third transistor during the heavy load condition may be the mirrored current (e.g., current 290).

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering. For example, means for sourcing may include a transistor such as the transistor 406.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

Example Aspects

In addition to the various aspects described above, specific combinations of aspects are within the scope of the disclosure, some of which are detailed below:

Aspect 1: A power supply circuit comprising: a first transistor having a source coupled to an input voltage (Vin) node and a drain coupled to an output voltage (Vout) node; a second transistor having a source coupled to the Vin node; a current limiter circuit; a third transistor having a source coupled to the current limiter circuit; and a fourth transistor having a source coupled to a reference potential node, wherein a drain of the second transistor and a drain of the third transistor are coupled to a source of the fourth transistor, and wherein a gate of the second transistor is coupled a gate of first transistor and a gate of the third transistor.

Aspect 2: The power supply circuit of Aspect 1, wherein, during a light load condition of the power supply circuit, the current limiter circuit and the third transistor are configured to provide a current that varies based on a voltage at the Vout node.

Aspect 3: The power supply circuit of Aspect 1 or 2, wherein, during a heavy load condition of the power supply circuit, the current limiter circuit and the third transistor are configured to provide a current that is limited based on a current threshold.

Aspect 4: The power supply circuit of Aspect 3, further comprising a current source configured to set the current threshold.

Aspect 5: The power supply circuit of any of the preceding Aspects, wherein: the first transistor and the second transistor form a first current mirror; and the first transistor and the third transistor form a second current mirror.

Aspect 6: The power supply circuit of any of the preceding Aspects, wherein: a size of the first transistor and a size of the second transistor have a first ratio; and a size of the first transistor and a size of the third transistor have a second ratio, the second ratio being less than the first ratio.

Aspect 7: The power supply circuit of any of the preceding Aspects, further comprising a current source, wherein the current limiter circuit comprises: a fifth transistor having a source coupled to the Vin node and a drain coupled to the current source; and a sixth transistor having a source coupled to the Vin node and a drain coupled to the source of the third transistor, wherein a gate of the sixth transistor is coupled to the drain and a gate of the fifth transistor.

Aspect 8: The power supply circuit of any of the preceding Aspects, further comprising a control circuit comprising: an amplifier having an output coupled to a gate of the fourth transistor; and a feedback path coupled between the Vout node and an input of the amplifier.

Aspect 9: The power supply circuit of Aspect 8, wherein another input of the amplifier is coupled to a reference voltage (VREF) node.

Aspect 10: The power supply circuit of Aspect 8 or 9, further comprising a resistor-capacitor (RC) circuit coupled between an output of the amplifier and the reference potential node.

Aspect 11: The power supply circuit of any of the preceding Aspects, wherein the third transistor and the current limiter circuit are configured to source a constant current during heavy load conditions of the power supply circuit.

Aspect 12: The power supply circuit of any of the preceding Aspects, wherein, during light load conditions of the power supply circuit, the third transistor and the current limiter circuit are configured to operate as a diode coupled between the Vin node and the fourth transistor.

Aspect 13: The power supply circuit of any of the preceding Aspects, further comprising a drain-to-source voltage (Vds) clamp circuit coupled to the drain of the second transistor.

Aspect 14: The power supply circuit of Aspect 13, wherein the Vds clamp circuit comprises: a fifth transistor having a source coupled to the drain of the second transistor; and an amplifier having a positive input coupled to the drain of the first transistor, a negative input coupled to the drain of the second transistor, and an output coupled to a gate of the fifth transistor.

Aspect 15: The power supply circuit of Aspect 14, further comprising a sixth transistor coupled between the drain of the third transistor and the drain of the fourth transistor.

Aspect 16: A method of supplying power by a power supply circuit, comprising: generating an output voltage based on a voltage at an input voltage (Vin) node via a first transistor having a gate coupled to a gate of a second transistor, wherein a source of the second transistor is coupled to the Vin node and wherein a drain of the second transistor is coupled to a drain of a third transistor; and sourcing a current to the third transistor, wherein: during a light load condition of the power supply circuit, the current varies based on the voltage at a Vout node of the power supply circuit; and during a heavy load condition of the power supply circuit, the current is limited based on a current threshold.

Aspect 17: The method of Aspect 16, further comprising setting a drain-to-source voltage (Vds) of the second transistor based on a Vds of the first transistor.

Aspect 18: The method of Aspect 16 or 17, further comprising mirroring a current sunk by a current source, wherein the current sourced to the third transistor during the heavy load condition comprises the mirrored current.

Aspect 19: The method of any of Aspects 16-18, wherein the current is limited based on the current threshold via a current limiter circuit, the method further comprising setting the current threshold via a current source coupled to the current limiter circuit.

Aspect 20: An apparatus for supplying power, comprising: a first transistor having a source coupled to an input voltage (Vin) node and a drain coupled to an output voltage (Vout) node; a second transistor having a source coupled to the Vin node; a third transistor having a source coupled to a reference potential node, wherein a drain of the second transistor is coupled to a drain of the third transistor, and wherein a gate of the second transistor is coupled to a gate of first transistor; and means for sourcing a current to the third transistor, wherein: during a light load condition of the apparatus, the current varies based on a voltage at the Vout node; and during a heavy load condition of the apparatus, the current is limited based on a current threshold.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit, comprising:
a first transistor having a source coupled to an input voltage (Vin) node and a drain coupled to an output voltage (Vout) node;
a second transistor having a source coupled to the Vin node;
a third transistor having a source coupled to a signal output of a current limiter circuit;
the current limiter circuit comprising:
a fifth transistor having a source coupled to the Vin node and a drain coupled to a current source; and
a sixth transistor having a source coupled to the Vin node and a drain coupled to the source of the third transistor, wherein a gate of the sixth transistor is coupled to the drain and a gate of the fifth transistor; and
a fourth transistor having a source coupled to a reference potential node, wherein a drain of the second transistor and a drain of the third transistor are coupled to a drain of the fourth transistor, and wherein a gate of the second transistor is coupled to a gate of the first transistor and a gate of the third transistor.

2. The power supply circuit of claim 1, wherein, during a light load condition of the power supply circuit, the current limiter circuit and the third transistor are configured to provide a current that varies based on a voltage at the Vout node.

3. The power supply circuit of claim 1, wherein, during a heavy load condition of the power supply circuit, the current limiter circuit and the third transistor are configured to provide a current that is limited based on a current threshold.

4. The power supply circuit of claim 3, further comprising a current source configured to set the current threshold.

5. The power supply circuit of claim 1, wherein:
the first transistor and the second transistor form a first current mirror; and
the first transistor and the third transistor form a second current mirror.

6. The power supply circuit of claim 1, wherein:
a size of the first transistor and a size of the second transistor have a first ratio; and
the size of the first transistor and a size of the third transistor have a second ratio, the second ratio being less than the first ratio.

7. The power supply circuit of claim 1, further comprising a control circuit comprising:
an amplifier having an output coupled to a gate of the fourth transistor; and
a feedback path coupled between the Vout node and an input of the amplifier.

8. The power supply circuit of claim 7, wherein another input of the amplifier is coupled to a reference voltage (VREF) node.

9. The power supply circuit of claim 7, further comprising a resistor-capacitor (RC) circuit coupled between an output of the amplifier and the reference potential node.

10. The power supply circuit of claim 1, wherein the third transistor and the current limiter circuit are configured to source a constant current during heavy load conditions of the power supply circuit.

11. The power supply circuit of claim 1, wherein, during light load conditions of the power supply circuit, the third transistor and the current limiter circuit are configured to operate as a diode coupled between the Vin node and the fourth transistor.

12. A power supply comprising:
a first transistor having a source coupled to an input voltage (Vin) node and a drain coupled to an output voltage (Vout) node;
a second transistor having a source coupled to the Vin node and a drain coupled to a drain-to-source voltage (Vds) clamp circuit;
a current limiter circuit;
a third transistor having a source coupled to a signal output of the current limiter circuit;
a fourth transistor having a source coupled to a reference potential node, wherein a drain of the second transistor and a drain of the third transistor are coupled to a drain of the fourth transistor, and wherein a gate of the second transistor is coupled to a gate of the first transistor and a gate of the third transistor; and
wherein the drain-to-source voltage (Vds) clamp circuit comprises:
a fifth transistor having a source coupled to the drain of the second transistor; and
an amplifier having a positive input coupled to the drain of the first transistor, a negative input coupled to the drain of the second transistor, and an output coupled to a gate of the fifth transistor.

13. The power supply circuit of claim 12, further comprising a sixth transistor coupled between the drain of the third transistor and the drain of the fourth transistor.

\* \* \* \* \*